(12) United States Patent
Manganiello et al.

(10) Patent No.: US 7,810,488 B2
(45) Date of Patent: Oct. 12, 2010

(54) HIGH EFFICIENCY ATMOSPHERIC STEAMER

(75) Inventors: Mark Manganiello, Everett, MA (US); Angelo Antonio Giangrande, Medford, MA (US)

(73) Assignee: Market Forge

( * ) Notice: Subject to any disclaimer, the term of this patent is extended or adjusted under 35 U.S.C. 154(b) by 18 days.

(21) Appl. No.: 12/154,055

(22) Filed: May 19, 2008

(65) Prior Publication Data

US 2008/0283040 A1  Nov. 20, 2008

Related U.S. Application Data

(60) Provisional application No. 60/930,885, filed on May 18, 2007.

(51) Int. Cl.
*A21B 1/00* (2006.01)
*A21B 1/06* (2006.01)
*A21B 1/08* (2006.01)

(52) U.S. Cl. .................... 126/369.2; 126/348; 126/369; 126/20; 126/381.1; 126/389.1; 99/330; 219/401; 236/15 A

(58) Field of Classification Search ................. 126/348, 126/369, 369.2, 369.3, 20, 20.1, 20.2, 381.1, 126/389.1; 99/330, 476, 467; 219/401; 236/15 A, 26 R, 26 A, 26 C; *A21B 1/00, A21B 1/06, 1/08, 1/24, 1/36*
See application file for complete search history.

(56) References Cited

U.S. PATENT DOCUMENTS 333,672 A * 1/1886 Richardson ................... 237/56

(Continued)

FOREIGN PATENT DOCUMENTS

DE  10110112 C1 *  5/2002

(Continued)

OTHER PUBLICATIONS

Product Specification Sheet—Groen SmartSteam 100 Boilerless Steamer Model (2)SSB-5GF.

(Continued)

*Primary Examiner*—Steven B McAllister
*Assistant Examiner*—Daniel E Namay
(74) *Attorney, Agent, or Firm*—Edwards Angell Palmer & Dodge LLP; Peter J. Manus

(57) ABSTRACT

A pressureless or atmospheric steamer for cooking food with a high cooking efficiency has a cooking compartment with an outlet for steam and condensate that feeds to a tempering tank via an outlet conduit. The outlet conduit is spaced closely from the controlled water level in the tempering tank, and is in fluid communication with the atmospheric vent to create an open steam cooker. A steam generator is adjacent the cooking compartment and has a water reservoir, a heat exchanger secured within the reservoir in a heat-transferring relationship at an exterior surface of the heat exchanger with the water held in the reservoir, and a heater that supplies heat to the interior of the heat exchanger. The tempering tank has a drain and level controls for a water supply held in the tempering tank. A pressure-sensitive device is disposed to measure the steam pressure in the cooking compartment and to generate electrical output signals indicative of minimum and maximum pressure values to control the operation of the heater to maintain the steam pressure in the cooking compartment within that operating range. The steamer has an in-built water filtration system for water supplied to the water reservoir.

19 Claims, 5 Drawing Sheets

U.S. PATENT DOCUMENTS

| | | | | |
|---|---|---|---|---|
| 777,470 | A * | 12/1904 | Ashert | 126/369.3 |
| 847,117 | A * | 3/1907 | Salmon | 99/339 |
| 850,824 | A * | 4/1907 | Eppley et al. | 126/369.2 |
| 921,041 | A * | 5/1909 | Williams | 126/369.2 |
| 1,060,500 | A * | 4/1913 | Salmon | 99/339 |
| 1,628,895 | A * | 5/1927 | McKenna | 126/20.2 |
| RE17,336 | E * | 6/1929 | McKenna | 126/20.2 |
| 2,012,676 | A * | 8/1935 | Williams | 431/185 |
| 3,967,615 | A * | 7/1976 | Petta, Jr. | 126/369.2 |
| 4,173,215 | A * | 11/1979 | Bureau et al. | 126/369 |
| 4,436,082 | A * | 3/1984 | Hiller et al. | 126/348 |
| 4,460,822 | A * | 7/1984 | Alden et al. | 219/401 |
| 4,995,313 | A * | 2/1991 | Delau et al. | 99/467 |
| 5,368,008 | A * | 11/1994 | Oslin | 126/20.2 |
| 5,549,038 | A * | 8/1996 | Kolvites | 99/330 |
| 5,631,033 | A * | 5/1997 | Kolvites | 426/233 |
| 5,640,946 | A * | 6/1997 | Oslin | 126/20 |
| 5,750,899 | A * | 5/1998 | Hegner et al. | 73/756 |
| 6,000,392 | A * | 12/1999 | Stritzl et al. | 126/369.2 |
| 6,107,605 | A * | 8/2000 | Creamer et al. | 219/401 |
| 6,175,100 | B1 * | 1/2001 | Creamer et al. | 219/401 |
| 6,237,469 | B1 * | 5/2001 | Stritzl et al. | 99/330 |
| 7,487,714 | B2 * | 2/2009 | Andoh et al. | 99/330 |
| 2003/0178411 | A1 * | 9/2003 | Manganiello et al. | 219/496 |
| 2006/0289441 | A1 * | 12/2006 | Bartelick | 219/401 |
| 2007/0089732 | A1 * | 4/2007 | Ricord et al. | 126/357.1 |
| 2008/0223354 | A1 * | 9/2008 | McGhee et al. | 126/20 |

FOREIGN PATENT DOCUMENTS

EP        92851 A  * 11/1983

OTHER PUBLICATIONS

Product Specification Sheet—Cleveland Steamcraft® Gemini™ 10 Model 24-CGA-10.2.

* cited by examiner

HIGH EFFICIENCY ATMOSPHERIC STEAMER

CROSS-REFERENCE TO RELATED APPLICATION

This application claims the benefit under 35 USC 119(e) of U.S. provisional application No. 60/930,885 filed May 18, 2007, the disclosure of which is incorporated herein by reference.

BACKGROUND OF THE INVENTION

A wide variety of steam cookers are known. While pressure cookers have long been used in homes and restaurants, the risks and extra costs of containing steam under high pressure have led to the growth of slow steam cookers that use steam to deliver heat to the food, but at a pressure that is typically just above atmosphere (e.g., a few inches of water). These slow steam cookers are commonly characterized as "pressureless" or "atmospheric."

Most conventional slow steam cookers have steam generators, typically boilers external to the cooking compartment that use electrical resistance or gas heaters that produce steam from a water supply.

A problem associated with many known pressureless steam cookers is excessive water consumption. Steam is drained from the cooking compartment through a drain pipe leading to a waste line. Many local codes regulate the operation of steam cookers and other water heating devices, barring draining water to a municipal waste line if its temperature is above 140° F. To comply with these regulations, the present standard practice is to spray cooling water into the exit steam to reduce the temperature of the condensate and steam fed into the drain line to an acceptable, lower level. This gives rise to water consumption in commercial steam cookers can exceed 50 gallons per hour, regardless of the quantity of food being cooked. A ten-pan, twin compartment, twin-generator steam cooker manufactured by Crown Food Service Corp. and described in U.S. Pat. No. 6,000,392 uses more than 100 gallons of water per hour to cool the drained steam and condensate.

In addition to poor water consumption efficiency, the thermal efficiency of a conventional pressureless steam cooker is not high. Regardless of the quantity of food being steamed in the cooking compartment, if the flow of steam into the compartment from a steam generator is continuous there is another significant loss of thermal energy In the initial phase of cooking a food product that is at room temperature, or is in a frozen state, the volume of steam required at the outset of cooking must be high. But when the food produced is thereafter in a heated condition, less steam is then required to complete the cooking operation. Many conventional pressureless steam cookers do not take into account the varying demand for steam in the course of a cooking operation, which reduces their efficiency.

Conventional pressureless steamers make it possible for a chef to operate the steamer as he does a conventional oven, opening its door to inspect or work with the foods, or to remove a cooking pan or pans from the steamer when the food is cooked. However, as steam is supplied to a cooking compartment by a boiler under pressure, when the door is opened to remove the cooked food, steam is then released to the atmosphere. The operator should exercise care in positioning himself away from the cooking compartment when opening its door.

The opening and closing of the oven door also produces a loss of steam, fluctuations in steam pressure, and introduce cold air into the compartment. The efficiency and the quality of operation of the steam cooker is dependent upon the degree to which the temperature and pressure of the steam within the cavity can be maintained at or near a preselected optimal value, or within an optimal range of values, despite variations due to the amount, type and temperature of the food being cooked and fluctuations in the steam temperature, movement, and pressure through the cooking cycle, and as the cooking compartment door is opened and closed.

The build-up of lime on the electric heater coils or the tubes of the steam generator because of the mineral content of the water being boiled also limits the thermal efficiency of known steamers. The resultant lime coating acts as a thermal insulating layer, thereby causing high-watt density electrical resistance heaters which are immersed in water to overheat and self-destruct. Where water is boiled by a gas-fired water-tubes boiler, a lime coating collects on the interior walls of the boiler tubes. The conventional practice is to remove the lime coating on the heater coils or the boiler tubes by means of a chemical solvent. But before the steam generator can be put back into service, the solvent must be completely flushed away, otherwise the solvent will contaminate the steam. The formation of lime deposits both limits energy efficiency and reduces the availability and convenience of use of slow steam cookers.

U.S. Pat. Nos. 5,549,038 and 5,631,033 to Kolvites and assigned to Market Forge Industries, Inc. and implemented in the six-pan steam cooker sold by Market Forge under the trade designation "STEAM TECH PLUS," describe solutions to some of these problems. Periodically, on demand, this cooker can draw water from a supply, heat the water in a boiler to produce steam, circulate the steam in a cooking chamber around the food to cook it and/or keep it warm until served, and then direct the steam and condensed water to a drain. The boiler is mounted on the side of an associated oven in direct fluid communication with that cooking chamber.

The Kolvites steamer modulates the power supplied to the boiler, and therefore the heat produced, to accommodate variations in the quantity of food, its temperature, and its surface area. A small amount of room temperature food will be cooked quickly with the steam generator powered. Continued heating will generate a dangerous overpressure and overcook the food. In the Kolvites steamer, a pressure-sensitive switch is connected in series in the power supply line. The switch responds to the steam pressure in an outlet conduit from the cooking compartment. To control an out-rush of steam when the cooking compartment door is opened, the Kolvites cooker uses a switch responsive to an opening of the door opens a valve in a fresh water supply line. The resulting cold water spray quenches (or "blows down") steam in the steam generator, creating a pressure drop there that draws steam in the cooking compartment back toward the boiler. This also conserves the steam, saving water and energy. A cold water spray is also used to cool a mechanical steam trap to open the steam outlet line to atmosphere when the door is opened. The Kolvites drain line from the cooking compartment terminates in, and is water-sealed to, a water filled tempering tank located below the cooking compartment. On start-up, the steam trap is cool and open to provide a path for cold air displaced by the new steam to escape to atmosphere.

U.S. Pat. No. 6,000,392 discloses a slow steam cooker with a steam generator for each cooking compartment that has a water tank adjacent to the cooking compartment heated by gas-fired, open-ended tubes immersed in the tank The steam produced is conducted to the cooking compartment by a narrow conduit.

These known pressureless steamers offer many advantages, such as rapid, efficient cooking of large volumes of food, including frozen food. Their disadvantages include one or more of: a relatively large water usage; attendant high power requirements to heat the water; and burdensome maintenance requirements such as daily, monthly and annual cleanings to remove scaling ("de-liming") on heating coils, tubes and other components produced by the boiling, as well as to remove residue from the cooking process itself. Also, as noted above, steam and hot water drained from these slow steam cookers must be cooled before it is drained to public waste systems.

It is therefore a principal object of this invention to provide a pressureless steamer that has improved energy usage and water consumption efficiencies.

Another object of the invention is to provide a pressureless steamer with the foregoing advantages that is gas fired.

Another object of the invention is to provide a steamer with the foregoing advantages that is freestanding, has high (e.g. twin oven, ten pan) cooking capacity, and is nevertheless compact and highly integrated.

Still another object of the invention is to provide the foregoing advantages with a ease of use, including deliming, as well as safe and reliable operation.

Yet another object of this invention is to provide an atmospheric twin generator steamer that is sufficiently efficient in its cooking energy usage to meet current US Government Energy Star standards.

SUMMARY OF THE INVENTION

A high efficiency atmospheric, pressureless steamer for cooking food has at least one cooking compartment with a door, an inlet for steam, and an outlet for steam and condensate. In the preferred form, it has two vertically stacked cooking compartments with a ten-pan capacity, total. A steam generator is disposed adjacent each cooking compartment. The generator has a water reservoir, a heat exchanger secured within the reservoir in a heat-transferring relationship at an exterior surface of the heat exchanger with the water held in the reservoir, and a heater that supplies heat to the interior of the heat exchanger.

A tempering tank vented to atmosphere has a drain and level controls for a water supply held in the tempering tank. A pressure-sensing device is disposed to measure the steam pressure in the at least one cooking compartment and to generate electrical output signals indicative of minimum and maximum pressure values constituting an operating range for the cooking that control the operation of said heater to maintain the steam pressure in the cooking compartment within the operating range. A switch operatively connected to the door allows the operation of the heater only when the door is closed.

A connector delivers steam from the steam generator to the cooking compartment, and an outlet conduit directs steam and condensate from the outlet to the tempering tank. The outlet conduit is spaced from the controlled water level in the tempering tank and in fluid communication with the atmospheric vent to create an open steam cooker.

The heater is preferably a gas burner disposed to apply its heat output to the interior of the heat exchanger. A gas pilot ignites the gas burner when there is a gas flow to the burner. A gas flow regulator operates in response to the door switch and the output signals of the pressure sensing device. The pressure value operating range is atmospheric to five inches of water, and preferably one to four inches of water.

With a gas burner, the steamer of this invention has a cooking energy efficiency of at least 38%. Preferably, the cooker consumes less than 20 gallons of water per hour in normal operation, with two cooking compartments operating has a working height of less than 65 inches, and has up to a ten-pan capacity in two cooking compartments.

These and other features and objects of the invention will be more fully understood from the following detailed description which should be read in light of the accompanying drawings.

DETAILED DESCRIPTION OF THE PREFERRED EMBODIMENT

Figure 1:
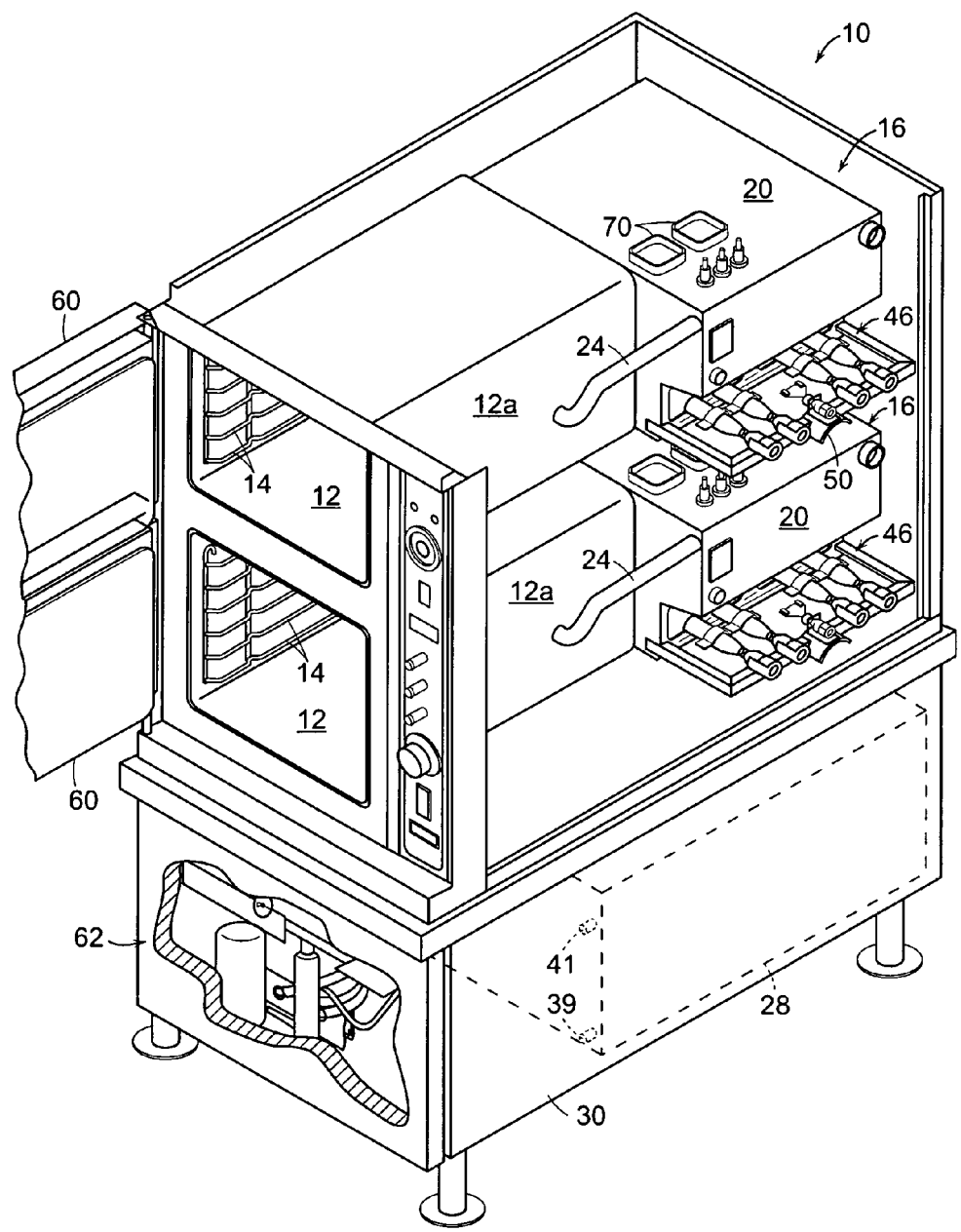
FIG. 1 is a view in perspective with portions broken away of an atmospheric twin generator steamer according to the present invention.
Figure 2:
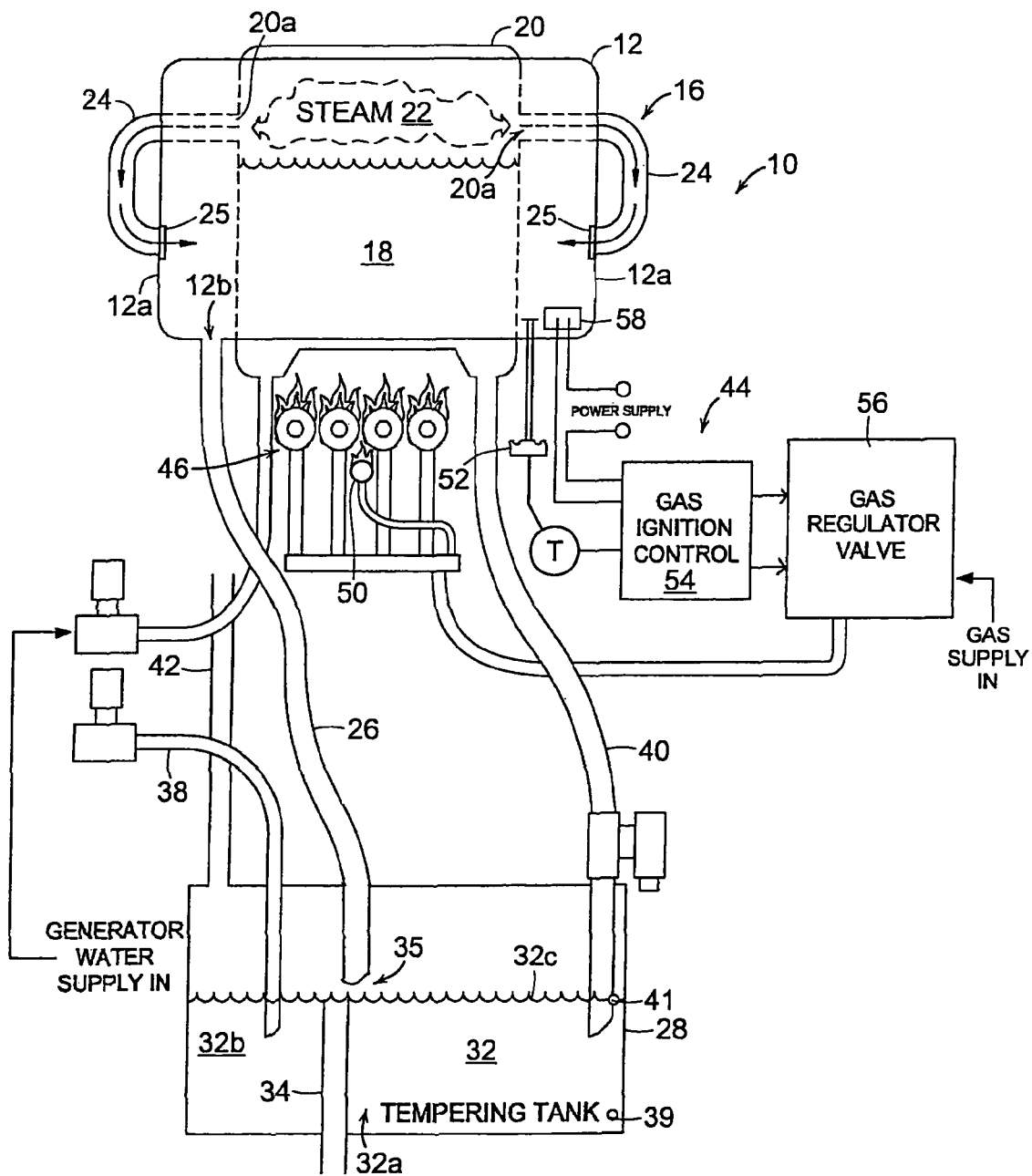
FIG. 2 is a schematic view of the steamer shown in FIG. 1.
Figure 3:
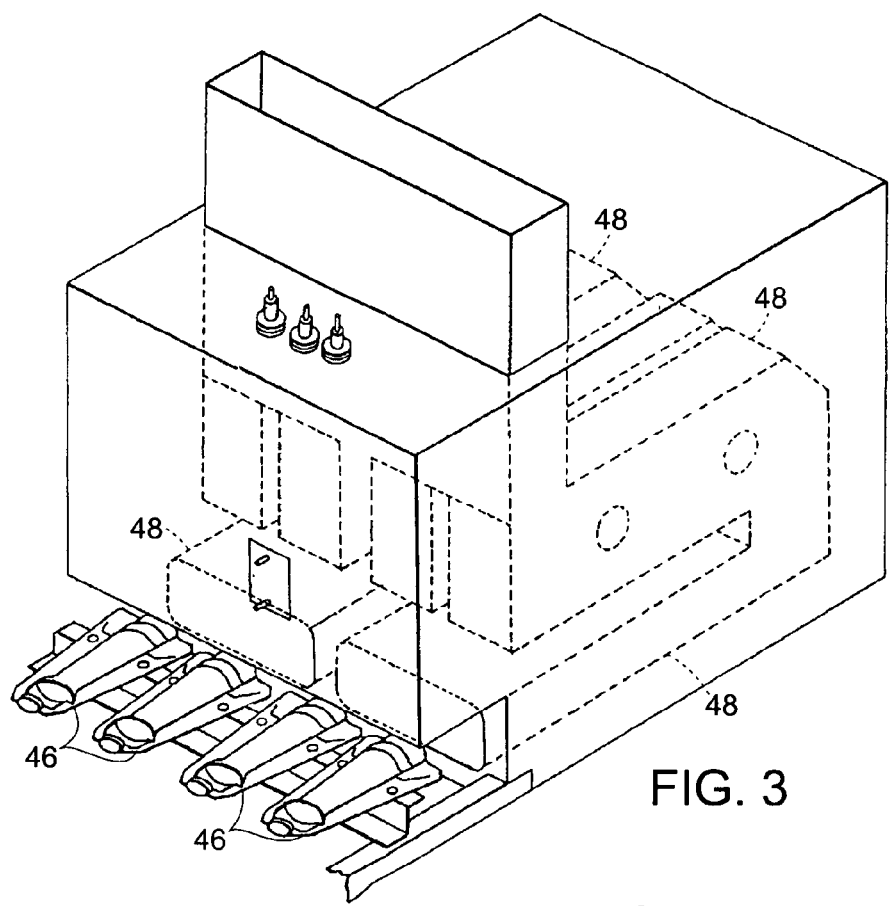
FIG. 3 is a simplified view in perspective of a steam generator shown in FIGS. 1 and 2.

FIGS. 1-4 show a pressureless or atmospheric slow steam cooker 10 according to the present invention. As illustrated, the cooker 10 is a freestanding floor unit with two vertically stacked cooking compartments 12 that each can receive up to five full-sized cooking pans slid into the compartments on racks 14 to provide a high cooking capacity. Each cooking compartment or oven 12 has an associated steam generator 16 that heats a supply 18 of water held in a tank 20 to produce steam 22 that is directed from a steam outlet 20a by conduits 24, 24 to opposite side walls 12a, 12a of the associated cooking compartment. On start up the steam displaces cold air from the cooking compartment. Then, as it fills and circulates within the cooking compartment 12, the steam gives up heat to the food to thaw, cook and/or warm it. In giving up its heat, the steam cools to become cooler, wet steam and condensate. This steam and condensate, along with food particulates produced by the cooking, collect at the bottom of the compartment 12 and flow out through outlet 12b where they are directed by a steam outlet conduit 26 to a tempering tank 28.

Figure 4:
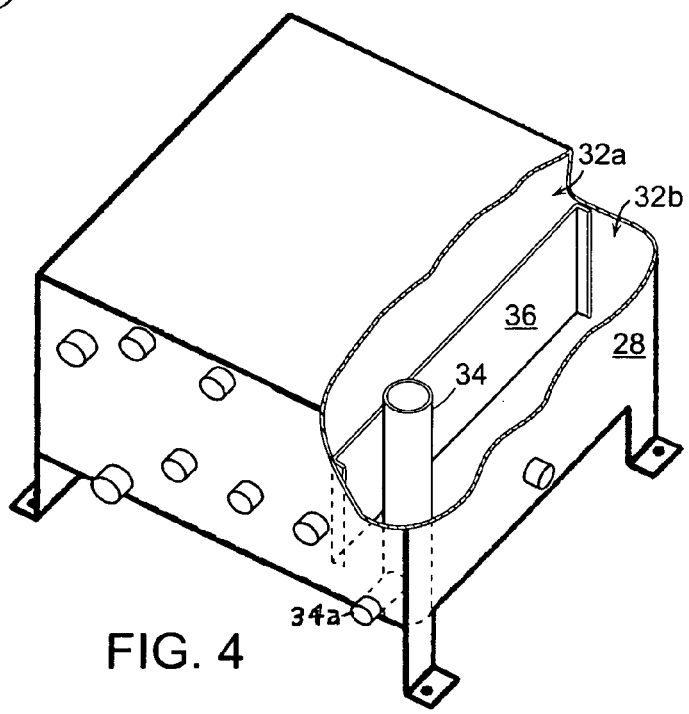
FIG. 4 is a simplified view in perspective of the tempering tank shown in FIGS. 1 and 2.

The tempering tank 28 is located in a base unit 30 that supports, and is secured to form an integral cooker with, the cooking compartments 12,12 and steam generators 16,16. The tank 28 holds a supply 32 of water held by an overflow weir 34 at a generally constant level 32c. The outlet end of the steam outlet conduit 26 is spaced closely, as indicated at 35, from the water 32. The outlet steam cools and condenses as it flows onto the water supply 32 where it mixes with the cooler water 32 in the tempering tank, as does the water already condensed in the cooking compartment and conduit 26 and also exiting to the tempering tank. A baffle plate 36 secured within the tempering tank with a spacing from the floor of the tank divides the water 32 into a hot region 32a where the outflow from the cooking compartment enters and cools, and a region 32b where colder water from the region 32a flows under the baffle, collects, and flows out via the overflow weir and drain 34 to a municipal sewer system or the like. The drain is shown schematically in FIG. 2. As seen in FIG. 4, the drain 34 for the tempering tank preferably includes side outlet drain 34a. A valved water supply line 38 supplies water to the tank 28 as needed to maintain the desired water level and provide the needed cooling capacity, as measured and controlled by a thermostat 39 and a float switch 41, both mounted in a front wall of the tank 28. The steam generator tank 20 also has a valved drain line 40 that feeds to the tempering tank, but with its outlet immersed in the water 32. The valved drain line 40 is energized to close when the power is turned on. This keeps the water in the steam generator 16 during normal use. When power is turned off, the drain line opens automatically to mix the hot water from the steam generator with the cold water in the tempering tank 28.

The tank is sized and constructed so that for a given cooker and cooking capacity it cools the incoming steam and condensate from typical temperatures near 212 degrees F. to about 140 degrees F. when it is drained out (although the thermostat 39 is preferably set to 130° F.) The drain 34 is also valved with a time delay to prevent all the colder water in the tank 28 from being drained until both steam generators 16, 16 are completely drained. This facilitates controlling the exit water temperature to the municipal sewer system to 140° F., or less.

The tempering tank avoids the use of a continuous flow of cooling water onto the effluent from the cooking compartment to cool it, thereby saving over 50 gallons per hour of water usage (as compared to that of comparable steamers constructed and operated according to the aforementioned U.S. Pat. No. 6,000,392, the disclosure of which is incorporated herein by reference.) Other construction and operation features of the tempering tank are described generally in the aforementioned U.S. Pat. Nos. 5,549,038 and 5,631,033 to Kolvites, the disclosures of which are incorporated herein by reference.

The tempering tank 28 has a vent 42 to atmosphere. Because the steam outlet line is spaced at 35, not immersed in the water 32 as taught in the Kolvites patents, the outlet is continuously in fluid communication with atmosphere, and the steam cooker 10 operates as an open system. With the steam flow restrictions of the steam conduits 24, 24, and nozzles 25, 25, secured at the outlet ends of the conduits, and the close spacing 35 but otherwise open-to-atmosphere steam outlet, the cooker 10 is atmospheric. The operating pressure within the cooking compartments 12, 12 and the outlet line 26 are maintained at a pressure just above atmosphere, in the range of 0 to typically five inches of water, and preferably one to four inches of water (twenty eight inches of water being about one psig pressure).

Steam is produced by a heater 44, shown in its preferred form using plural gas burners 46 that heats the interior of a heat exchanger tubes 48, 48 having a generally U-shaped configuration and immersed in a heat-transferring relationship in the associated water supply 18. The construction and operation of the heat-exchanger is described generally in the aforementioned '392 patent. In the present embodiment, however, there are various changes from the arrangement described and shown in the '392 patent.

First, there are four in-shot burners (instead of two) fed gas by a common manifold and heating two side-by side heat exchange tubes 48, 48. This provides a faster heating and allows a closer control over the cooking. Second, instead of an electric spark ignition for the main burners as used in the '392 system, the present invention uses a gas pilot 50 disposed between pairs of the burners 46, 46. An electric spark ignition is only used to light the small pilot flame on initial start up, but not during the cooking as the burners are lit and extinguished periodically. Third, the present embodiment uses a pair of steam conduits 24, 24 to deliver steam to the cooking compartment, not one connector tube as in the '392 heat exchanger. Fourth, the present generator uses a pressure sensing switch 52 to measure the steam pressure in the associated cooking compartment. Also, the output signal from the switch 52 signaling that heat is required to raise the pressure is applied to a gas ignition control 54 via a delay timer T that introduces a small delay, e.g., 30 seconds, in between when the lower pressure limit is sensed and a "HEAT ON" signal is generated. This delays the generation of a signal by the control 54 to a gas regulator valve 56 that in turn initiates a flow of gas to the burners 46, 46. As in the '392 steamer, a door switch 58 signals if the cooking compartment door 60 is open or closed. The switch 58 closes to supply electrical power to the gas ignition control only if the door 60 is closed. This prevents the loss of steam from the cooking compartment though the wide door opening to atmosphere, and reduces the risk of an out-rush of steam from the compartment onto a person using the steamer.

The steamer 10 is freestanding, highly integrated, and self contained. It requires only standard 120 volt, 60 Hz, single phase electrical power (for use in the US), and a conventional water supply. In the preferred form illustrated, the steamer 10 also has an integral water filtration unit 62 mounted in its base and connected in the water feed line to the steam generator 16 to pre-treat the water and thereby help to control the formation of lime deposits in the steam generator. A suitable filtration unit 62 is manufactured by Cuno and includes its Aqua Pure HF40 filter to remove chlorine, sediment, cyst and bacteria, its Aqua Pure HF8-5 filter as a scale inhibitor mounted on an Aqua Pure Scale Gard HT manifold and a Cuno monitor connected in fluid communication with, and downstream from, the filters to monitor their status. Further, the steamer 10 has readily accessible top ports 70, 70 on the steam generators to facilitate the use of de-liming solvents.

The steamer 10 as shown and described with a two-oven, ten full-sized pan capacity, has a height of about 64 inches and a footprint of about 24 inches in width and 33 inches in depth (excluding flue exhaust). This compactness is greatly aided by the integral heaters 44, 44 located adjacent and behind associated cooking compartments 12, 12 and the integrated tempering tank 28 disposed below the heaters and the cooking compartments and the self-contained water filter system. The present invention is also believed to be the first atmospheric steamer that has an in-built water filtration system disposed, in the embodiment shown, below the cooking compartments and in front of the tempering tank 28. Moreover, the steamer 10 in a ten-pan, two compartment configuration is ergonomically friendly with a working height to the top compartment 64 inches and a working height from the floor of about 24 to 25 inches. A single compartment steamer 10 that can accommodate five 12"×20"×2½" deep pans has a height of about 52 inches, a width of about 24 inches and a depth of about 33 inches (excluding flue exhaust).

A significant advantage of the present invention is the reduction of required maintenance and the increased ease of installation. Conventional steamers of comparable capacity, and operating under comparable conditions require at least a daily inspection for lime build-up, and are recommended for a daily de-liming. With the present invention, it is recommended to wipe down the steamer daily to remove food particulates and the like. De-liming is required only once every other month. Replacement of the water filters in the water filter system 62 is facilitated by their ready access at the lower front of the steamer through a door. Preferably the state of the filters are monitored and an alarm sounded, lit or otherwise raised to indicate when they should be replaced.

Figure 5:
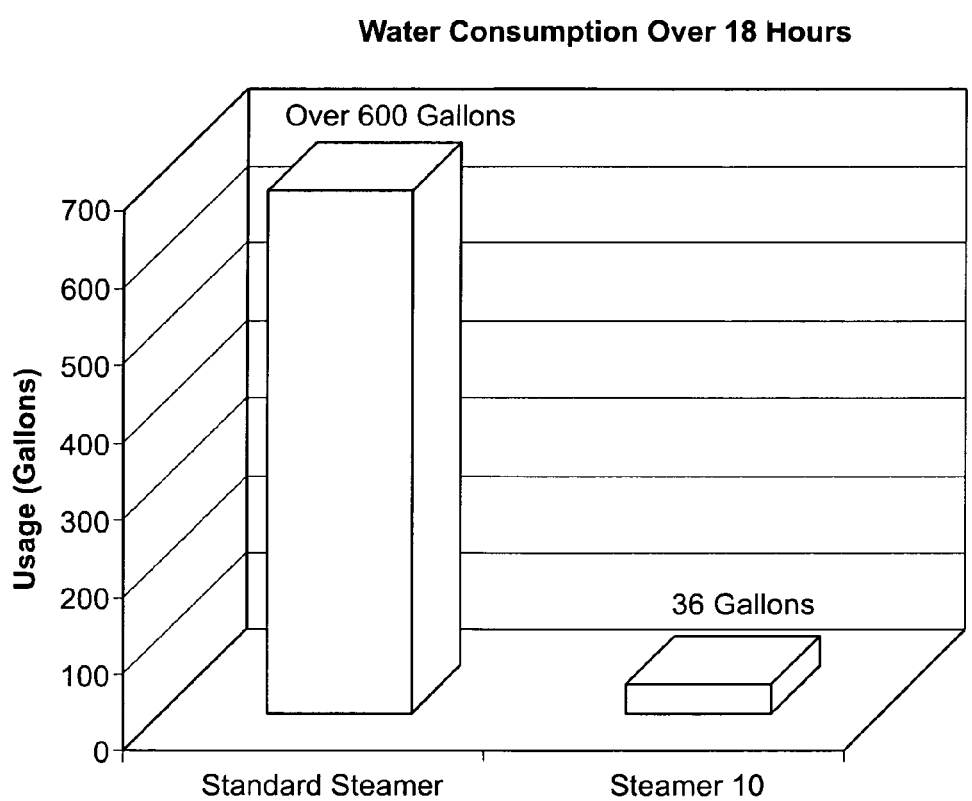
FIGS. 5 and 6 are graphs comparing water and gas usage of a steamer according to the present invention and a conventional steamer.
Figure 6:
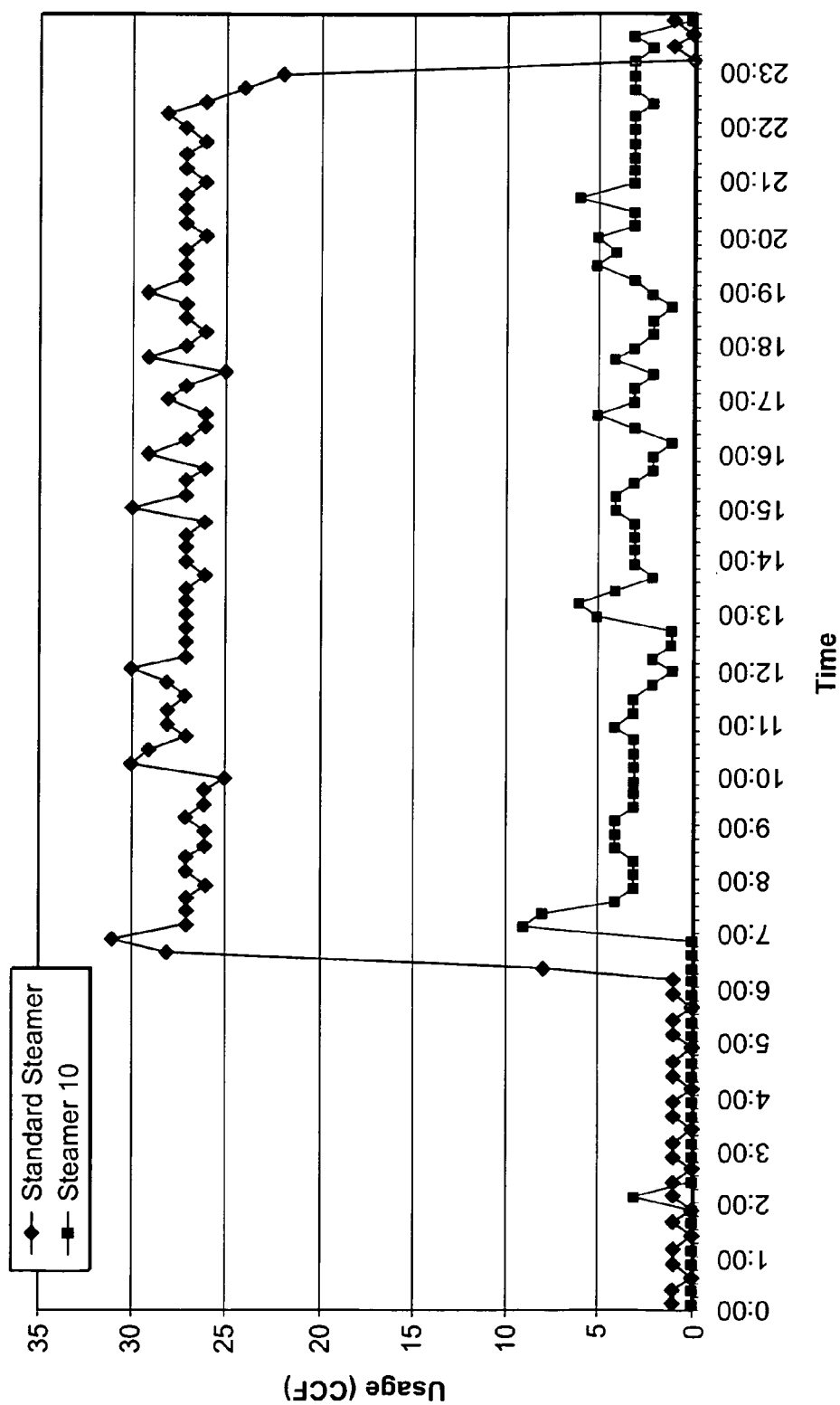

FIGS. 5 and 6 illustrate the very significant efficiencies of the steamer of the present invention with respect to water consumption and gas usage. FIGS. 5 and 6 reflects tests of a ten, full-sized pan steamer 10 operating over an 18-hour period as compared to a comparably-sized prior art atmospheric steamer operating on the same cooling payload and other conditions as the steamer 10. The steamer 10 used was a commercial Market Forge Model ETP-10G atmospheric steamer. As shown in FIG. 5, the present invention saves about 600 gallons of water, measured with a water meter, per 18-hour operating day. Compared generally to typical prior art atmospheric steamers, the steamers of the present invention, for comparable capacity and usage, consume about a one-fifth of the water used by a conventional steamer (an 80% savings). Gas consumption, as shown by FIG. 6, was consistently much less than for a comparable standard steamer operating under the same conditions, about a 7 to 1 reduction in gas usage as shown. The steamer 10 used in the FIG. 6 test was the Market Forge Model ETP-10G.

Installation is facilitated by the high degree of integration of the steamer 12. The heaters and water filtration system are in-built, avoiding the need to plan the location and hook-up of these systems and the extra parts and labor involved for separate, eternal filtration and boiler systems.

The pressureless steamer 10 has been tested using the ASTM F1484-05 red potato test with the steamer classified per ASTM F1217-97 revised 2012 Draft AC as a Type III floor-mounted unit on cabinet base, Grade A, zero to 2.9 psig compartment pressure, Size b, two compartment steamer, with a style iii self contained, gas-fired steam generator and a maximum cooking capacity of at least six full-sized pans. The cooker was installed and tested per section 9 and the potatoes cooked were as specified in section 10.8. The following test results were produced cooking ten full-sized pans. The energy consumed by the steam cooker was calculated as about 11,625 Btu for each compartment. The maximum energy input rate was about 41,922 Btu/hour for each compartment. The preheat energy consumption was about 5.660 Btu/hr for each compartment over a duration of just under 8 minutes. (Because the compartments are vented continuously, cold air in the compartments on start up can exhaust directly to atmosphere as steam enters the compartment, thereby avoiding the need for a steam trap as described in the Kolvites patents.) For a heavy whole potato load the cooking energy efficiency was just under 40%. While current ratings were established when six pan cooking compartments were the standard for high capacity operation, even with a ten pan cooking load the steam cooker of the present invention produced an energy efficiency value that exceeds the 38% specification to qualify for an Energy Star rating established as a joint program of the U.S. Environmental Protection Agency and the U.S. Department of Energy to promote energy conservation in homes and businesses. This is particularly significant as the Food Service Technology Center has estimated that as much as 80% of the approximately $10 billion current annual energy costs for the commercial foodservice sector is expended by inefficient food cooking and holding/storage equipment.

There has been described a pressureless or atmospheric steam cooker that is highly efficient in its energy consumption and water usage, has a large cooking capacity, operates quickly and conveniently, can be gas-fired, is compact even in a freestanding form, meets regulations regarding the disposal of hot liquid effluents, and is safe to operate.

While the invention has been described with respect to its presently preferred embodiments, it will be understood that various modification and alterations will occur to those skilled in the art from the foregoing detailed description and the accompanying drawings. For example, while the invention has been described with reference to a twin oven, twin generator steam cooker, it can be realized with a single oven and associated generator. While the invention has also been described with reference to a freestanding floor mounted steam cooker, it can be adapted to a countertop unit, e.g., one where a tempering tank is installed in a counter and the countertop steam cooker is placed on the counter over the tempering tank. Further, while the invention has been described with reference to a gas-fired heater for the steam generator, the heater can be implemented with an electrical heater. The specific implementation of the heat exchanger can also vary. Different numbers and types of exchanger tubes, burners, and burners per tube can be used, as well as different ignition arrangements and heater/cooking compartment pressure controls. For example, electrical spark ignition devices can be used in place of the gas pilot, albeit with a loss of reliability and/or increased maintenance. It is also possible to operate without the delay in the ignition of the heater following the cooking compartment pressure sensor detecting a lower or minimum limit pressure value, but with some loss of energy efficiency.

Still another variation includes using a twin cooking compartment steamer 10, but using only one compartment 12 as a cooking compartment, and the other as a holding compartment for cooked foods. Steam can be added continuously to the holding compartment to maintain the temperature of the cooked foods. Because immediately after cooking cooked foods are normally above a holding temperature (e.g. of 150 to 170° F.), it would take a while (perhaps an hour or more) for foods to fall to a temperature that would cycle the holding heating on, and once on, any water and energy consumption to hold a set temperature would be much lower than used in cooking. The cooking and other efficiencies of the present invention would still be retained, albeit on a somewhat reduced level.

These and other variations and modifications that will occur to those skilled in the art are intended to fall within the scope of the appended claims.

What is claimed is:

1. A pressureless steamer for cooking food comprising:
  a cooking compartment having a door, an inlet for steam and an outlet for steam and condensate,
  a steam generator disposed adjacent said cooking compartment having a water reservoir, a heat exchanger secured within said reservoir in a heat-transferring relationship at an exterior surface of said heat exchanger with the water held in said reservoir, and a heater that supplies heat to the interior of said heat exchanger,
  a tempering tank vented to atmosphere having a drain and level controls for a water supply held in the tempering tank,
  a pressure-sensing device disposed to measure the steam pressure in said cooking compartment and to generate electrical output signals indicative of minimum and maximum pressure values constituting an operating range for the cooking that control the operation of said heater to maintain the steam pressure in said cooking compartment within said operating range,
  a switch operatively connected to said door that allows the operation of said heater only when said door is closed,
  a connector that delivers steam from said steam generator to said cooking compartment, and an outlet conduit that directs steam and condensate from said outlet to said tempering tank, said outlet conduit being spaced above said controlled water level in said tempering tank and in fluid communication with said atmospheric vent at all times to vent steam to atmosphere.

2. The pressureless steam cooker of claim 1 wherein said heater is a gas burner disposed to apply its heat output the interior of said heat exchanger.

3. The pressureless cooker of claim 2 wherein said heater further comprises a gas pilot disposed to ignite said gas burner when there is a gas flow to said burner.

4. The pressureless cooker of claim 3 wherein said heater further comprises a gas flow regulator that operates in response to said door switch and said output signals of said pressure sensing device.

5. The pressureless cooker of claim 1 wherein said pressure value operating range is atmosphere to five inches of water.

6. The pressureless cooker of claim 5 wherein said pressure value operating range is one to four inches of water.

7. The pressureless cooker of claim 1 wherein said tempering tank includes a baffle that creates a high temperature region of said water adjacent said drain conduit outlet and a region of lower temperature in direct fluid communication with said drain.

8. The pressure cooker of claim 2 wherein said pressure sensing device includes a time delay device operatively connected to delay the delivery of said minimum pressure level signal to said heater.

9. The pressureless cooker of claim 2 wherein said heat exchanger tube comprises two open-ended, U-shaped tubes in each of said reservoirs and said gas burners comprise two in-shot burners at an inlet end of each of said tubes.

10. The pressureless cooker of claim 1 further comprising an integrally mounted water filter connected in a water supply line to said steam generator.

11. The pressureless cooker of claim 1 wherein said cooking compartment comprises two vertically arrayed cooking compartments and said steam generator comprises two steam generators each associated with one of said cooking compartments, and said tempering tank is located below said cooking compartments.

12. The pressureless cooker of claim 11 wherein said connector comprises a pair of conduits and nozzles that deliver steam from each of said steam generators to the associated one of said steam compartments at different locations to produce a lively steam within said cooking compartment.

13. The pressureless cooker of claim 12 wherein said steam generator is located at the rear of the associated ones of said cooking compartments and said conduits terminate in said nozzles and said nozzles are located in opposed side walls of said associated cooking compartment.

14. The pressureless cooker of claim 8 wherein said gas burner has a cooking energy efficiency of at least 38%.

15. The pressureless cooker of claim 2 wherein the cooker consumes less than 8 gallons of water per hour in normal operation.

16. The pressureless cooker of claim 11 wherein the pressureless cooker has a working height of less than 65 inches.

17. The pressureless cooker of claim 11 wherein the pressureless cooker has up to a ten pan capacity in said cooking compartments.

18. The pressureless cooker of claim 17 wherein said heater is a gas burner disposed to apply its heat output to the interior of said heat exchanger, said pressure sensing device includes a time delay device operating connected to delay the delivery of said minimum pressure level signal to said heater, and said gas burner has a cooking efficiency of at least 38%.

19. The pressureless cooker of claim 13 further comprising an integrally mounted water filter in a water supply line to said steam generator.

* * * * *